(12) United States Patent
Yang

(10) Patent No.: US 6,804,464 B2
(45) Date of Patent: Oct. 12, 2004

(54) FLEXIBLE AND LOW COST WAVELENGTH MANAGEMENT FOR OPTICAL NETWORKING

(75) Inventor: Dan Dan Yang, Ottawa (CA)

(73) Assignee: Dowslake Microsystems Corporation, Santa Clara, CA (US)

( * ) Notice: Subject to any disclaimer, the term of this patent is extended or adjusted under 35 U.S.C. 154(b) by 535 days.

(21) Appl. No.: 09/781,254

(22) Filed: Feb. 13, 2001

(65) Prior Publication Data

US 2002/0109881 A1 Aug. 15, 2002

Related U.S. Application Data

(60) Provisional application No. 60/244,600, filed on Nov. 1, 2000.

(51) Int. Cl.[7] .................. H04B 10/08; H04B 10/02; H04B 10/00; H04J 14/02
(52) U.S. Cl. .................. 398/94; 398/160; 398/177; 398/34; 398/37
(58) Field of Search .................. 398/33–34, 38, 398/45, 68, 92–94, 120, 130, 138, 140, 157–160, 177, 192, 197, 202–204, 37, 82, 87; 359/337.1, 337.11, 337.12, 337.13, 337.21, 347.31, 341.41, 341.42

(56) References Cited

U.S. PATENT DOCUMENTS

| | | | |
|---|---|---|---|
| 5,005,937 A | * | 4/1991 | Aida et al. ............... 385/24 |
| 5,500,756 A | * | 3/1996 | Tsushima et al. ......... 398/181 |
| 5,594,581 A | * | 1/1997 | Alphonsus ............... 398/6 |
| 5,838,476 A | * | 11/1998 | Harasawa et al. ......... 398/177 |
| 6,049,413 A | * | 4/2000 | Taylor et al. ............. 359/337 |
| 6,094,296 A | * | 7/2000 | Kosaka ................... 359/341.41 |
| 6,101,025 A | * | 8/2000 | Naganuma ............... 359/341.33 |
| 6,108,123 A | * | 8/2000 | Kinoshita ................ 359/337 |
| 6,175,435 B1 | * | 1/2001 | Watanabe ................ 398/150 |
| 6,219,177 B1 | * | 4/2001 | Tamura .................. 359/341.1 |
| 6,271,945 B1 | * | 8/2001 | Terahara ................. 398/26 |
| 6,392,769 B1 | * | 5/2002 | Ford et al. ............... 398/9 |
| 6,421,149 B2 | * | 7/2002 | Tervonen et al. .......... 398/9 |
| 6,424,445 B1 | * | 7/2002 | Tsushima et al. ......... 398/177 |
| 6,466,348 B1 | * | 10/2002 | Izumi .................... 398/177 |
| 6,473,210 B1 | * | 10/2002 | Evjenth et al. ........... 398/38 |
| 6,522,434 B1 | * | 2/2003 | Jennings et al. .......... 398/28 |
| 6,535,309 B1 | * | 3/2003 | Terahara ................. 398/79 |
| 6,643,055 B1 | * | 11/2003 | Askinger et al. .......... 359/337.12 |

* cited by examiner

*Primary Examiner*—Leslie Pascal
*Assistant Examiner*—Dalzid Singh
(74) *Attorney, Agent, or Firm*—Cassan Maclean

(57) ABSTRACT

A method and devices for individually controlling the signal strength of single or multiple optical channels. A controller module monitors the signal strength of channels and amplifies those that need amplifying while attenuating those that are too strong using the same Erbium doped fiber amplifier. A controllable compensation module receives at least one channel and, when required, can either amplify or attenuate the signal strength of the channel(s). The module can be constructed out of a single fiber with an associated pump laser. If the laser provides insufficient pumping power, the fiber acts as an attenuator. If the laser provides a higher level of pump power, the fiber acts as an amplifier.

13 Claims, 8 Drawing Sheets

FLEXIBLE AND LOW COST WAVELENGTH MANAGEMENT FOR OPTICAL NETWORKING

This application claims the benefit of Provisional App. No. 60/244,600 filed Nov. 1, 2000

FIELD OF THE INVENTION

The present invention relates to optical network wavelength management and configuration and, more specifically, to a programmable optical processor.

BACKGROUND TO THE INVENTION

The unprecedented growth of the Internet, E-commerce, private networks, high resolution digital video, and voice over IP is dramatically changing the demand for high speed broadband networks. Dense Wavelength Division Multiplexing (DWDM) technology has been deployed and widely adopted not only for long-haul backbone networks, but also for the metropolitan network market. The fundamental idea of DWDM technology is to simultaneously transmit multiple wavelengths over the same fiber. Systems based on DWDM often have optical amplifiers, especially Erbium doped fiber based amplifiers, to compensate for transmission losses incurred during transmission. However, theses optical amplifiers often cannot amplify different wavelength channels equally, resulting in signal strength differences among channels.

The evolution of optical networks has also brought a new kind of system topology, where an individual or a sub-group of several wavelength channels, among the whole group, may be switched, added, or dropped at a certain central office (referred as optical nodes). This may result in different transmission paths with individual or sub-groups of several wavelength channels transmitting through different network elements. Both result in different transmission losses (by fiber and/or devices) for different channels or sub-groups of channels.

Whether due to amplification, and/or to differences in transmission loss, when these channels reach a receiver, they do not have the same signal strength. The difference in signal strength can result in a situation where some channels overload the receiver because of too much power while others cause detection errors because of a weak incoming signal.

As an example, if group A channels are being sent to receiver A1 and group B channels are being sent to receiver B1 and both group A and B channels transit through the same amplifier, problems may occur. If receiver A1 is much closer to the amplifier than receiver B1, then group A signals may arrive with more power at receiver A1 than group B signals when they arrive at receiver B1. This is primarily because both group A and B share the same amplification medium and the amplifier cannot adjust its amplification of certain channels or groups individually travelling on the same fiber.

Currently, two methods exist which can compensate for such problems. The first is termed the pre or post tilting method (also called padding)—each channel is provided with a tilt either before the channel reaches the receiver or after the channel has left the transmitter. This method implies the use of separate optical attenuators for each channel. These attenuators can be set such that channels with a stronger signal strength are attenuated or given more loss than channels with a weaker signal strength. The signal strengths of the channels are thus equalized by the time the channels reach the receiver.

The second method involves gain flattening of optical amplifiers. Gain flattening filters are used with an optical amplifier so that stronger channels (channels with a higher signal strength) have their gain or amplification curtailed to equalize the signal strength among all the channels.

Network designers currently choose one or both of the two above methods. Both of these methods rely on a single concept—the attenuation of the signal strength of stronger channels. Unfortunately, attenuation can prove to be costly. The pre-tilt method necessitates a large number of attenuators. Each attenuator can be costly and, for a typical 40 channel system with one attenuator assigned to each channel, the cost rises accordingly for the whole system. For the gain flattening approach, the cost can also be correspondingly high. Not only does the system designer have to factor in the cost of the amplifier but also the complexity of the structure, waste of pump power, more components and lower manufacturing yield.

While there are gain flattened amplifiers now available, the physics of Erbium doped fiber amplifiers renders gain flattening quite difficult, especially to the level that an optical network requires. This difficulty causes a low yield rate when manufacturing gain flattened fiber amplifiers.

Also, when using gain flattened fiber amplifiers, a much larger pump laser (one providing more power) is required. This is because more pump power is required to compensate for the decreased amplification caused by the attenuation through the gain flattening filter. For the above reasons, gain flattened amplifiers, even passively flattened ones, are about 30–50% more expensive than non-gain flattened amplifiers for the same amplification factor.

There is therefore a need for a new approach which allows controllable amplification and/or attenuation of selected channels. Such a new method, and the apparatus which implements it, must necessarily overcome the problems associated with the known techniques as outlined above.

SUMMARY OF THE INVENTION

The present invention overcomes the problems discussed above by providing a method and devices for individually controlling the signal strength of single or multiple optical channels. A controller module monitors the signal strength of channels and amplifies those that need amplifying while attenuating those that are too strong using the same Erbium doped fiber amplifier. A controllable compensation module receives at least one channel and, when required, can either amplify or attenuate the signal strength of the channel(s). The module can be constructed out of a single fiber with an associated pump laser. If the laser provides insufficient pumping power, the fiber acts as an attenuator. If the laser provides a higher level of pump power, the fiber acts as an amplifier.

By independently controlling each compensation module, the signal strength of each channel or group of channels can be independently increased or decreased. This provides a level of control for each channel or channel group that is unprecedented. Because of this, costly pre-tilt and/or gain flattening methods of channel equalization are avoided.

In a first aspect the present invention provides a system for controlling the signal strength of multiple optical channels prior to said channels being received by an optical receiver. The system comprises an optical demultiplexer receiving a compound input (multi-wavelength) optical signal and demultiplexing the input optical signal into the individual or groups of optical channels, a plurality of controllable compensation modules with each module receiving at least one channel or channel group, a channel strength monitor which monitors the signal strength of each of the multiple optical channels, a controller coupled to the monitor and to each of the compensation modules, the controller causing each of the modules to amplify or attenuate the signal strength of the channels or channel groups received by each of the modules based on an output from the monitor to the controller, and an optical signal multiplexer receiving the multiple optical channels from the compensation modules. The multiplexer multiplexes the multiple channels into a compound output signal to be received by the receiver. Each of the compensation modules controls the signal strength of the channels or channel groups based on an input from the controller and is capable of both attenuating or amplifying at least one optical channel or channel group.

In a second aspect the present invention provides a programmable optical processor capable of changing a signal strength of an input optical signal. The processor comprises a controllable compensation module receiving the input optical signal and producing an output optical signal, a controller controlling the compensation module and a signal strength monitor coupled to the controller and coupled to determine the signal strength of the input optical signal and of the output optical signal. The controller causes the module to attenuate or amplify the signal strength of the input optical signal to produce the output signal based on an input from the signal strength monitor. Also included is a software program that allows a user to program the output level of each individual channel or channel group according to the required network condition.

In a third aspect the present invention provides a method of controlling a signal strength of multiple optical channels. The method comprises determining the signal strength of each of the multiple optical channels, determining for each optical channel or channel group whether the channel requires a change in signal strength based on predetermined criteria, for each optical channel. When the optical channel requires a change in signal strength, determining an amount of change required in signal strength. When the optical channel or channel group requires an increase in signal strength, amplifying the optical channel or channel group, and when the optical channel requires a decrease in signal strength, attenuating the optical channel or channel group.

In a fourth aspect the present invention provides a method of changing the signal strength of an optical signal using a single optical medium. The method comprises the following steps:

Providing a predetermined length of optical fiber as the optical medium, the optical fiber being capable of absorbing a proportion of an optical signal. The optical fiber is also capable of amplifying an optical signal when the fiber is provided with optical pump power higher than a threshold, the threshold being an amount of optical pump power sufficient to overcome the fiber's absorption of the optical signal.

The second step is providing a pump laser coupled to the optical fiber, the pump laser being capable of providing a controllable power output to the optical fiber, and capable of providing optical power higher than the threshold.

The third step is providing an input optical signal to the optical fiber.

As a fourth step, when the input optical signal is to be amplified, the pump laser is operated such that the power output the pump laser is higher than the threshold.

The fifth step is when input optical signal is to be attenuated, operating the pump laser such that the power output of the pump laser is lower than the threshold.

In a fifth aspect the present invention provides a controllable optical signal compensation module for attenuating or amplifying an optical signal. The module comprises an optical fiber having a predetermined length, the fiber receiving the optical signal, and a pump laser coupled to the optical fiber, the laser being adapted to provide optical power to the fiber. The fiber attenuates the signal strength of the optical signal when the pump laser provides an insufficient amount of optical power to overcome the fiber's absorption of said optical signal, and the fiber amplifies the signal strength of the optical signal when the optical power provided by the pump laser is greater than the amount required to overcome the absorption of the optical signal by the fiber.

BRIEF DESCRIPTION OF THE DRAWINGS

A better understanding of the invention may be obtained by reading the detailed description of the invention below, in conjunction with the following drawings, in which.

DETAILED DESCRIPTION OF THE PREFERRED EMBODIMENT

Figure 1:
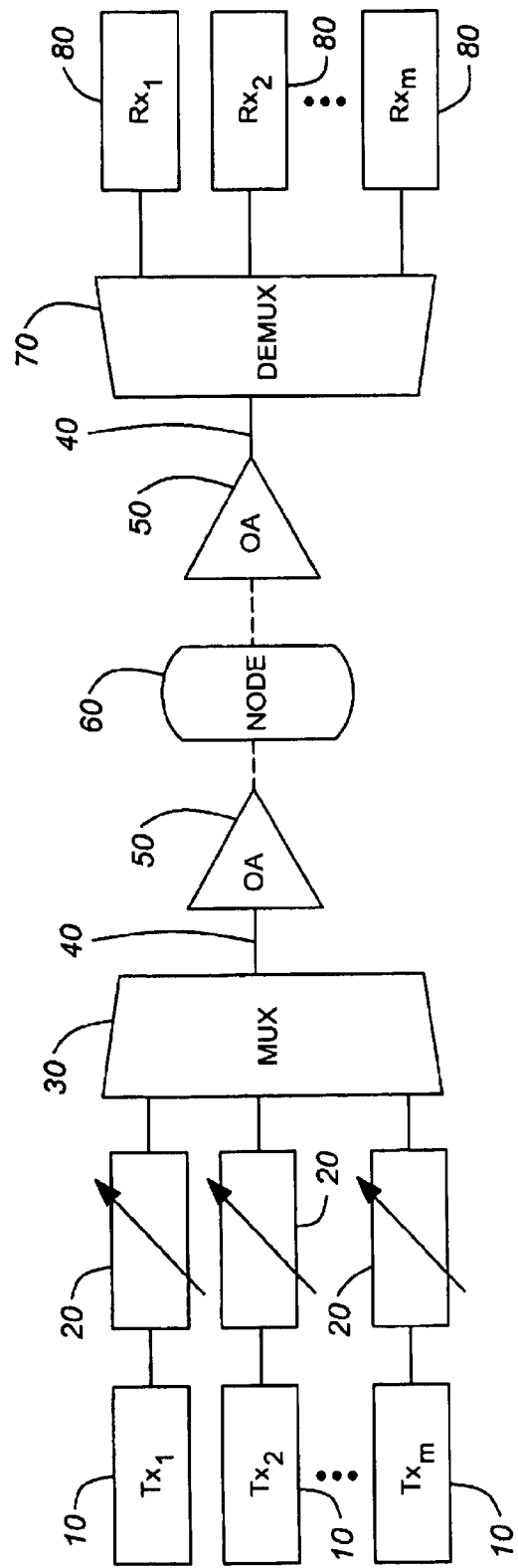
FIG. 1 is a block diagram of a multichannel optical fiber transport system according to the prior art.

Referring to FIG. 1, a multi-channel transport system according to the prior art is illustrated. Transmitters 10 feed variable attenuators 20 which in turn feed a multiplexer 30. The multiplexer 30 multiplexes the channels from transmitters into an optical path such as an optical fiber line 40, which feeds into one or more optical amplifiers 50. These optical amplifiers 50 are gain flattened to provide equal gain to all the channels on the single line 40. Between the optical amplifiers 50 may be multiple nodes 60, only one being illustrated in FIG. 1. These nodes may add, drop, or switch channels from the single optical line 40. The gain equalized channels are then fed into a demultiplexer 70 where the channels are demultiplexed to be further sent to multiple receivers 80.

It should be noted that while FIG. 1 places the adjustable attenuators 20 between the transmitters 10 and the multiplexer 30, these attenuators may also be placed between the demultiplexer 70 and the receiver 80.

The system of FIG. 1 equalizes the signal strength of the channels where possible whether within or without the optical amplifiers by attenuating the stronger channels using attenuators 20. As noted above, this approach leads to costly equipment. It should also be noted that the system of FIG. 1 cannot control the signal strength of individual channels between the multiplexer 30 and the demultiplexer 70. Any channels added by node 60 will have an uncontrolled signal strength compared to the signal strength of the pre-existing channels on the path 40.

Figure 2:
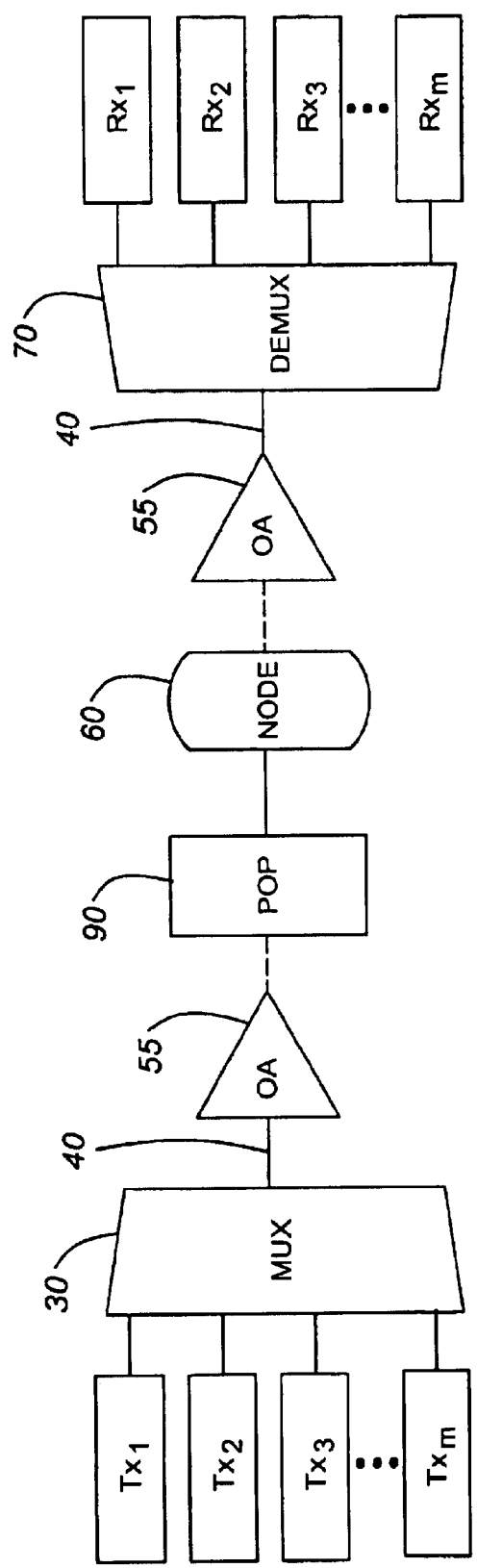
FIG. 2 is a block diagram of a multichannel transport system according to one aspect of the invention.

FIG. 2 illustrates a system according to one aspect of the invention. With similar numbers referencing similar components, the system of FIG. 2 adds an extra component—a programmable optical processor (POP) 90. It should be noted that the optical amplifiers 55 in FIG. 2 are low cost non gain-flattened optical amplifiers. The programmable optical processor 90 uses software to control the signal strength of the channels on the single optical link 40 according to any criteria desired such as receiver requirements or other network conditions.

Figure 3:
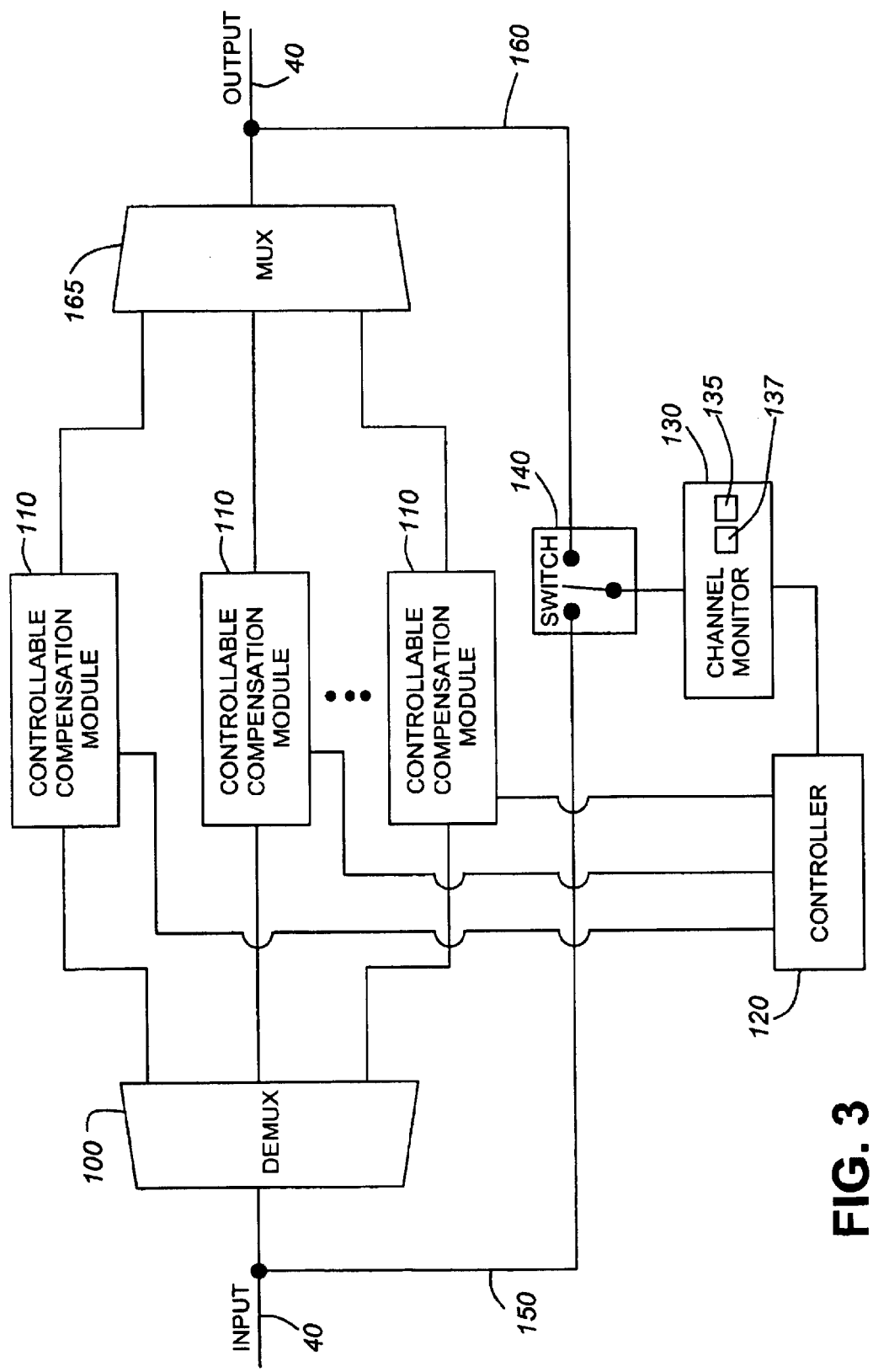
FIG. 3 is a block diagram of a programmable optical processor according to another aspect of the invention.

Referring to FIG. 3, a configuration for the POP 90 is illustrated. The single optical line 40 is fed into a demultiplexer 100 which demultiplexes the compound multiple wavelength optical signal into its multiple components of channels. These channels are then fed into a controllable compensation module 110. These modules are coupled to and controlled by a controller 120. The controller 120 is, in turn coupled to a channel monitor 130 which, using an optical switch 140 is able to determine the signal strength of each channel through optical taps 150 and 160.

The output of the modules 110 are then transmitted to a multiplexer 165 which multiplexes them into another single optical line 40. However, the input signal to demultiplexer 100 is generally different from the output signal of multiplexer 165 in that the output signal may now have different channel power levels.

The working of this system is as follows: the channel monitor determines the input signal strength of each channel through switch 140 and tap 150. The results are then sent to the controller 120. Based on this determination and predetermined criteria programmed into the controller 120, the controller 120 determines whether a given channel or group of channels need to have its signal strength amplified, attenuated, or left unchanged.

If the channel or group of channels need signal strength attenuation, the controller 120 commands the relevant compensation module to attenuate the incoming channel(s). If, on the other hand, signal strength amplification is needed, then the controller 120 commands the compensation module 110 to amplify the incoming channel(s). After this, the signals are remultiplexed by the multiplexer 165.

Figure 4:
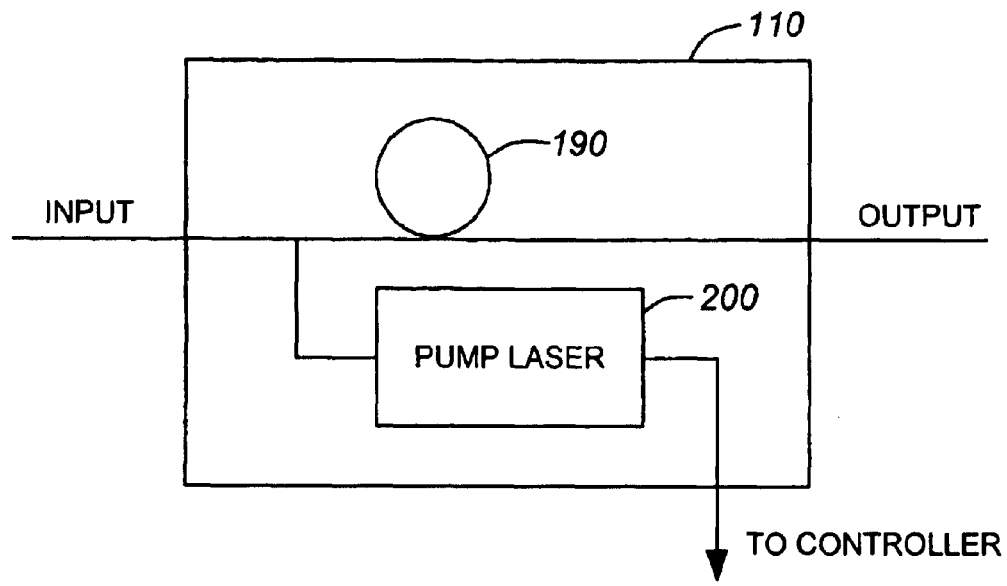
FIG. 4 is a block diagram of a controllable compensation module according to another aspect of the invention.

It should be clear from the above that the compensation modules 110 are each capable of either amplifying or attenuating an incoming signal or channel. It should also be clear that the levels of attenuation or amplification are controllable by the controller 120. FIG. 4 illustrates one configuration for the compensation module. The module 110, consists of an optical fiber 190 of predetermined length along with a pump laser 200. The pump laser 200 is controlled by the controller 120 and the fiber 190 receives the optical signal. The fiber 190 can be a very short piece of Erbium doped fiber or waveguide and the pump laser can be a diode laser. This short piece of Erbium doped fiber/waveguide exhibits attenuation when the injected pump laser power is insufficient to compensate for the absorption of the signal by the fiber/waveguide. However, when the pump laser power is sufficient to overcome this absorption, then the fiber/waveguide amplifies the signal. A detailed calculation using conventional erbium fiber simulation tools can predict the required erbium fiber length. Typically, it is straightforward to obtain an attenuation from 10 dB to 0 dB and gain from 0 dB to 10 dB. Such an erbium fiber based device is used to compensate for the discrepancies among the channels as described herein. For this purpose, such a relatively small gain is enough.

It should be noted that the optical signal may contain more than one channel and that the module 110 is either attenuating or amplifying the signal. By setting the amplification or the attenuation to zero, the module may nominally be amplifying or attenuating but is not changing the signal strength of a channel.

Figure 5:
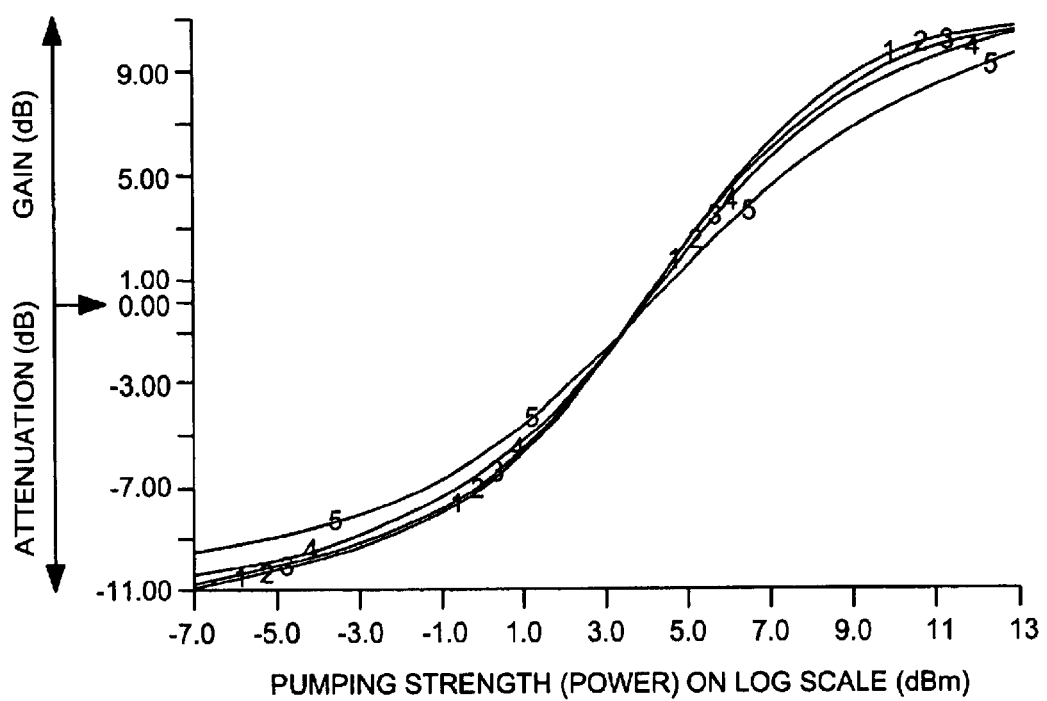
FIG. 5 is a graph showing attenuation and amplification in an optical fiber dependent on pump laser power.

FIG. 5 illustrates a graph showing the attenuation/amplification discussed above for a piece of Erbium doped fiber or waveguide. With the horizontal axis as the pumping power or strength from a pump laser and the vertical axis as the gain/attenuation, it can be seen that below zero gain pumping power the attenuation (negative gain) increases. Concomitantly, as the pump power increases, above the zero gain point the gain increases as well.

While the above example uses an Erbium doped fiber or waveguide, the optical medium in the module as illustrated in FIG. 4 can be any optical medium which absorbs optical power when an insufficient amount of pump optical power (usually from a pump laser) is injected into the medium. Such a medium attenuates an input signal when the pump power is insufficient. However, this medium must also amplify the input optical signal when the pump power provided by the pump laser is sufficient to overcome the medium's optical signal absorption. Needless to say, the pump laser 200 (FIG. 4) must be capable of outputting enough pump power to overcome this absorption. Other than an Erbium doped fiber/waveguide, it has been found that an InGaAs (Indium Gallium Arsenide) based semiconductor waveguide, such as that used for semiconductor optical amplifiers, can also be used.

Regarding the channel monitor 130 (FIG. 3), this device is used to determine the intensity of both the incoming and the outgoing optical channels. The monitor 130 can be either a diffraction grating or scanning filter, as long as each channel's wavelength and intensity can be directly detected. In one configuration, the monitor can be a diffraction grating 135 combined with a CCD (charge coupled device) detector 137. In another configuration, the monitor 130 can be a scanning filter 139 which scans the input or output signal channel by channel with each channel's wavelength information being calculated using a comparison of the signal with an initial calibration.

Figure 6:
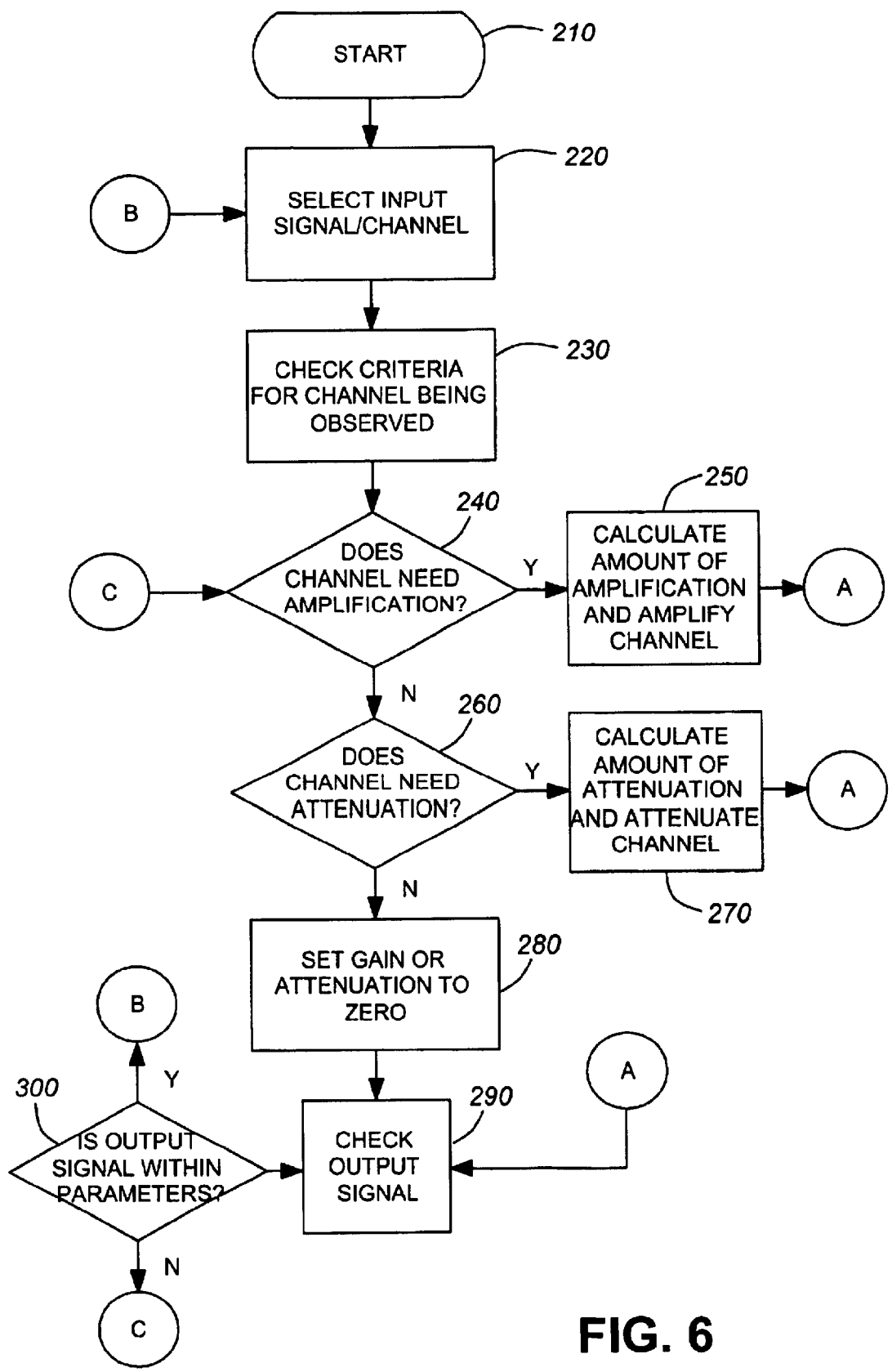
FIG. 6 is a flow-chart of the logic followed by the controller of the programmable optical processor.

The software running the controller 120 is illustrated in the flowchart of FIG. 6.

As can be seen from FIG. 6, the process begins at step 210. Then, the channel monitor detects the input signal or channel at step 220. This detection involves determining the signal strength of the chosen signal/channel. (Thus, if there are 10 channels multiplexed into one compound signal, the monitor can choose only one of the 10.) Step 230 is that of checking the predetermined criteria for the requirement for the particular signal being examined. As an example, if the end receiver can only take a certain signal strength, then this can be the basis for the upper limit of a predetermined range of an acceptable signal strength. On the other hand, if too high data bit error rate (BER) is caused by a signal strength below a certain threshold, then this threshold can form the lower limit of the same predetermined range. Thus, the range is for an acceptable signal strength for a channel. If the channel's signal strength is above the upper limit, then the channel must be attenuated.

As another example, if a channel is added to the system for inclusion in the output compound signal, this channel may have too low a signal strength. Thus, such as channel would need to be amplified based not only on the detected signal strength but also on the requirements of the system. Alternatively, if a channel is to be routed to a destination different from that of the other channels, this channel may need to be attenuated or amplified depending on whether its destination is physically further or nearer than the other channels' destination. If further, then the channel may need to be boosted (amplified) to compensate for expected signal degradation. If nearer, then the channel may need to be attenuated to prevent an excessive signal strength reaching the end receiver.

It should be noted that the criteria for amplifying or attenuating a particular channel is under a user's control. The controller can be programmed to attenuate or amplify a channel based on the user's needs or what the user perceives to be the system's needs.

If, as will be explained below, multiple other optical network elements are added to the system, these network elements may reduce the signal strength of the channels passing through them. Such a reduction can be compensated for by programming the controller that if a channel passes through a network element (such as optical cross connect or an add/drop multiplexer), then that channel has to be amplified.

Step 240 is that of determining whether the chosen channel needs amplification based on the check in step 230. If so, then the channel is amplified (Step 250). This would involve the controller determining the amount of amplification needed and then commanding the module receiving the channel to amplify the channel. Once this has been done, connector A in FIG. 6 shows that the logic jumps to step 290.

Step 260 is that of determining whether the channel requires attenuation based on the check done in step 230. If so, step 270 details attenuating this channel. This involves the controller calculating the amount of attenuation needed and then commanding the module receiving the channel to attenuate its input. Again, connector A in FIG. 6 shows that the logic jumps to step 290.

If the decisions 240 and 260 are answered in the negative, then the channel's signal strength is to be neither amplified nor attenuated (step 280). This can be done by the controller setting the amplification or attenuation of a channel to zero.

Step 290 is that of checking the output signal to determine whether the signal strength is within the expected range after the channel is attenuated or amplified. Step 300 is that of actually comparing what was detected in step 290 with the desired signal strength. If the output channel is not within acceptable limits, then connector C shows that the logic must return to step 240. This loop ensures that the output is as expected. On the other hand, if the signal is within limits, then connector B shows that the logic returns to step 220, beginning the process anew by selecting another channel.

It should be noted that, while FIG. 3 shows the channel monitor 130 taps the input and output signals before and after the multiplexer and demultiplexer respectively, the monitor may intercept these signals immediately prior to and after the compensation module. This may, however, involve a more complex control mechanism for the monitor than the simple optical switch 140 of FIG. 3.

The monitor 130 necessarily monitors the input and the output as the gain/attenuation provided by the compensation module may vary from module to module. While the module will have a specific range of gain/attenuation, as can be seen from FIG. 5, the performance curve is far from linear. Thus, while it is possible to calculate the amount of pump power required to provide a specific gain/attenuation, it has been found that a searching algorithm executed by the controller works best. By extension, the zero loss/gain point for each module may be different. By constantly monitoring the input and the output of the module (through the compound signal), the gain/attenuation given to a specific channel or channel group can easily be calculated by the controller.

Figure 7:
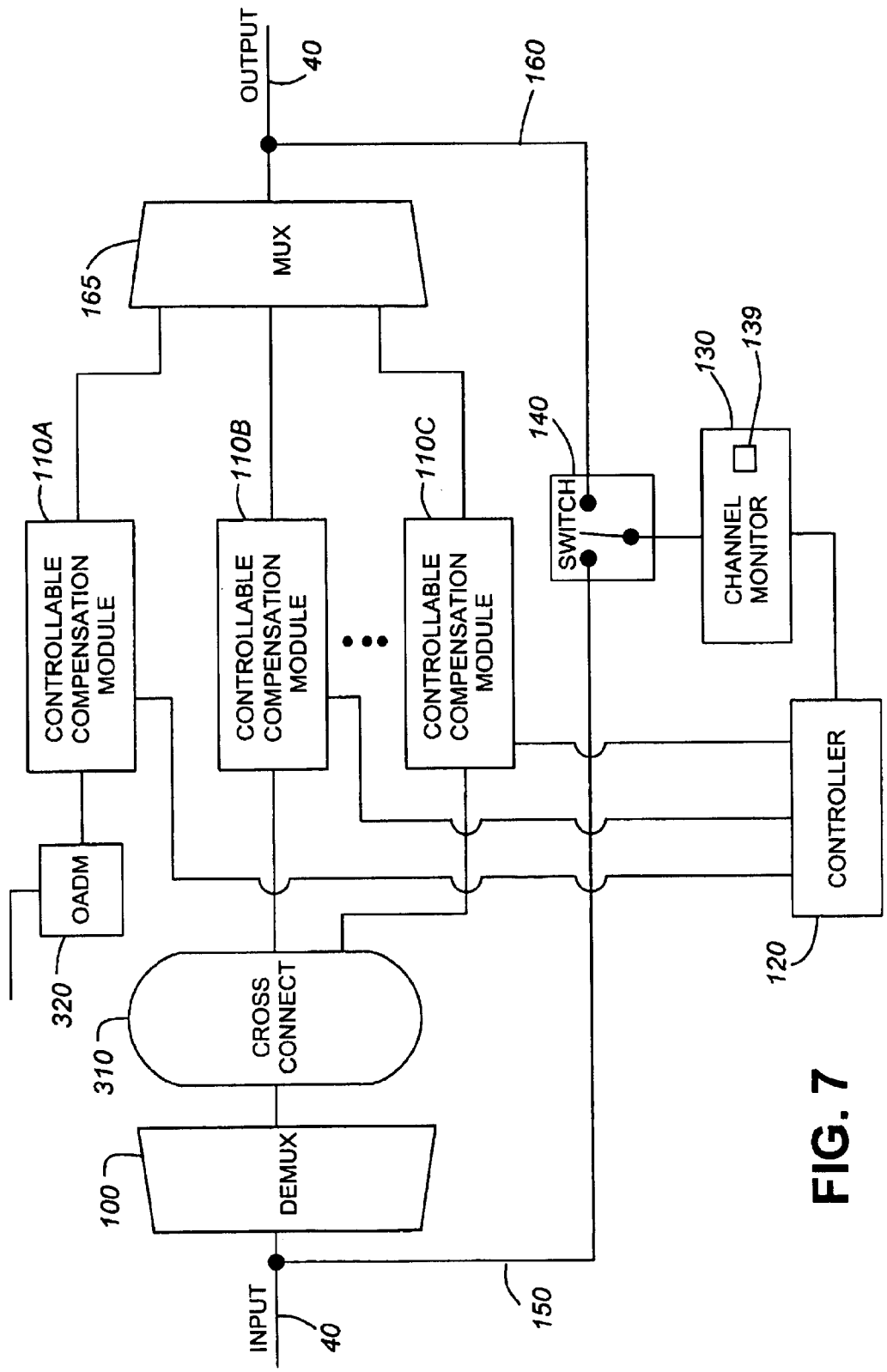
FIG. 7 is a block diagram of an expanded programmable optical processor.

As noted above, the system illustrated in FIG. 3 can contain other network elements. FIG. 7 illustrates such an expanded system. FIG. 7 differs from FIG. 3 in that FIG. 7 incorporates an optical cross connect module 310 and an optical add/drop multiplexer (OADM) 320. As can be seen, the outputs of these two modules 310, 320 are fed into compensation modules 110A, 110B and 110C. The controller 120, knowing that the compensation modules 110A, 110B, 110C are receiving channels from modules which reduce signal strength, can thus command these compensation modules to amplify their respective channels. Alternatively, if the input from these network elements are not desired, the controller can command the compensation modules receiving their channels to attenuate and suppress to a certain degree these channels.

To further explain, if the channel entering the system from the OADM 320 is not desired then the compensation module 110A can be commanded by the controller 120 to attenuate this channel. On the other hand, the output of the cross connect 310 can simultaneously be commanded to be amplified by compensation modules 110B and 110C.

While the input to the OADM 320 originates from outside the system, its signal strength can still be monitored by the monitor 130 through the switch 140. By selecting the channel from the OADM 320 on the output compound signal 40 when the compensation module 110A is set to zero attenuation or amplification, the input signal strength of the channel can be detected by the monitor 130. Once this is detected, the controller 120 can adjust it accordingly.

Figure 8:
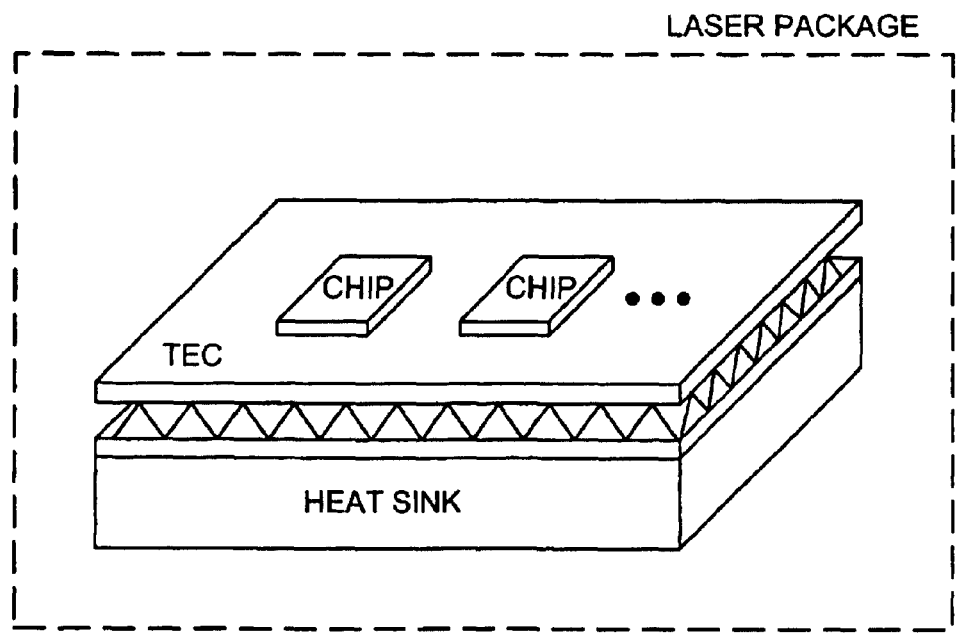
FIG. 8 is a diagram of multiple semiconductor lasers in one laser package.

While the compensation module illustrated in FIG. 4 is shown as a monolithic self contained module, by using a package with multiple lasers, both the size and the control complexity can be significantly reduced. Referring to FIG. 8, a laser package with multiple lasers on a single shared TEC (thermo electric cooler) is illustrated. This will simplify control for compensation modules which may need similar settings. As an example, the modules 110A and 110C in FIGS. 7 and 8 have a common input from the optical cross-connect 310. A single laser package with two lasers as in FIG. 8 can be used for these compensation modules.

What the invention allows is an unprecedented control over a compound (multi-wavelength) optical signal. The invention "digitizes" a compound optical signal into multiple channel groups and independently controls each of these groups. Thus, if a compound signal carries 40 optical channels, the demultiplexer 100 (see FIG. 3) can demultiplex these 40 channels into any number of groups. For maximum resolution and control, the 40 channels can be demultiplexed into 40 different signals feeding 40 different compensation modules. This allows each of these channels to be individually controlled in terms of amplification and attenuation.

Of course, such resolution requires multiple compensation modules and a 1×40 demultiplexer. For lesser resolution, the 40 channels can be "digitized" into 8 groups of 5 channels each. Each channel group thus has 5 channels and each of the channel groups can sample be individually controlled with a compensation module dedicated to each group. As an example, (see FIG. 9 where a full optical spectrum is divided or digitized into groups A–L) if channel group A needs a 2 dB gain while groups B and C need a 4 dB attenuation and the rest (group D–L) need no modification, the software can be commanded to implement this. When the controller examines group A, the compensation module for this group amplifies the group A channels by 2 dB. For groups B and C, the signals are attenuated by 4 dB. The compensation modules for the other channel groups D to L are set to the zero gain point so that they act simply as a pass-through for the channels in groups D to L.

Figure 9:
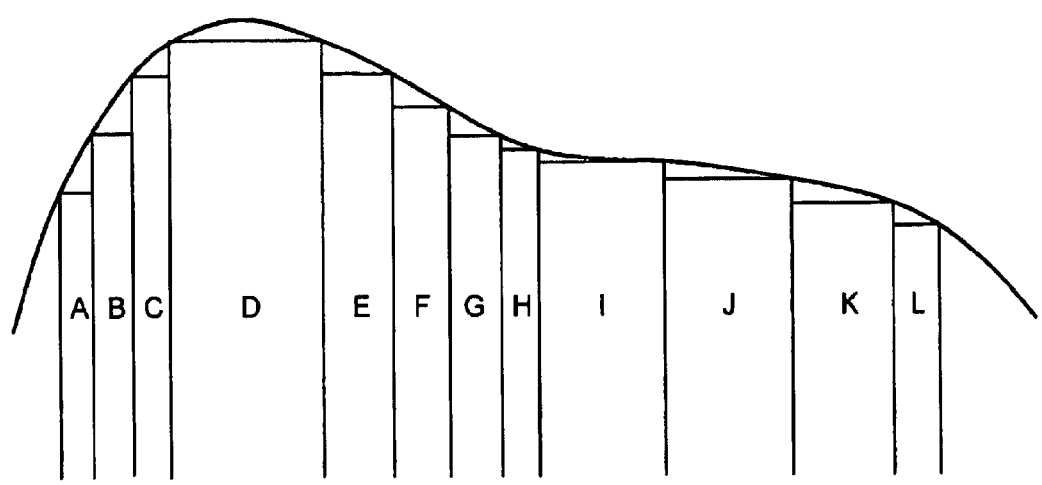
FIG. 9 is an illustration of an optical spectrum which has been grouped or "digitized" for better control as used in the invention.

If the user wished to modify only the top and bottom ranges of the spectrum in FIG. 9, then groups A and B and groups I–L can be amplified.

While the above envisions compensation modules which can both attenuate and amplify, a compensation module may be constructed such that it can only amplify or attenuate but not both. If a user does not require attenuation for his system but only amplification, then the compensation module can be constructed thus. The same can be true for a user who only requires attenuation and not amplification.

Based on the above, selected portions of a network's bandwidth can be controlled. Instead of amplifying or attenuating the whole network bandwidth, selected portions can be attenuated or amplified according to need. By properly choosing the channels to be grouped together, sections of the full bandwidth can be isolated for control.

If, given a full network bandwidth, channels A1, A2, and A3 constitute the high end of the band, channels B1, B2 and B3 constitute the middle range while channels C1, C2 and C3 constitute the low end of the band, proper groupings allow control of selected sections of the band. If A1, A2 and A3 are grouped together, B1, B2 and B3 are grouped together and c1, C2 and C3 are grouped together, the high low, and middle ranges of the band can be independently controlled. The compensation module serving A1, A2 and A3 can be commanded to amplify these channels while the module receiving C1, C2 and C3 can be similarly commanded. For the module receiving B1, B2 and B3, it may be commanded to attenuate these channels. Thus, in this example, the high and low ends of the bandwidth are amplified while the middle portion is attenuated. Similarly, if the whole bandwidth was to be amplified, then all the groups would have to be amplified. Control over individual channels can be had by, as noted above, increasing the resolution of the system. Further control can be had over groups A by feeding the 3 channel group into another demultplexer which separates the group into individual channels. These individual channels can then be fed into their own compensation modules which will control the strength of the channels.

As can be seen in FIG. 9, the bandwidth ranges into which the full spectrum is divided into need not be equal. From FIG. 9, group A occupies a narrower bandwidth range than group D. The bandwidth range of the "digitization" or grouping of channels is within the user's control. By passing the complete spectrum through different bandpass filters, the groupings as illustrated in FIG. 9 can be obtained.

A person understanding the above-described invention may now conceive of alternative designs, using the principles described herein. All such designs which fall within the scope of the claims appended hereto are considered to be part of the present invention.

I claim:

1. A system for use with non gain flattened optical amplifiers and for controlling the signal strength of multiple groups of optical channels prior to said groups of channels being received by an optical receiver, said system comprising:

an optical demultiplexer receiving a compound input (multi-wavelength) optical signal and demultiplexing said input optical signal into said multiple groups of optical channels;

a plurality of controllable compensation modules, each module receiving at least one group of channels;

a channel strength monitor which monitors the signal strength of each of said multiple groups of optical channels;

a controller coupled to said monitor and to each of said compensation modules, said controller causing each of said modules to amplify or attenuate the signal strength of the at least one group of channels received by each of said modules based on an output from said monitor to said controller; and an optical signal multiplexer receiving said multiple groups of optical channels from said compensation modules, said multiplexer multiplexing said multiplexing said multiple groups of channels into a compound output signal to be received by said receiver, wherein each of said compensation module controls the signal strength of said at least one channel based on an input from said controller;

said channel strength monitor determines at least one of an input and an output signal strength of said groups of optical channels.

2. A system as in claim 1, wherein each of said compensation modules is capable of both attenuating or amplifying at least one group of optical channels.

3. A system as in claim 1 wherein said channel strength monitor includes an optical switch such that said monitor can determine an input signal strength and an output signal strength of each group of channels by changing a setting of said optical switch.

4. A system as in claim 1 wherein said channel strength monitor is coupled to an optical switch such that said monitor can be coupled to either said compound input optical signal or said compound output optical signal by changing a setting of said optical switch.

5. A system as in claim 2 wherein said compensation module comprises: a pump laser controlled by said controller; and a predetermined length of Erbium doped fiber receiving said at least one group of optical channels, wherein said fiber attenuates the signal strength of said at least one group of optical channels when said pump laser injects an insufficient amount of pump power to overcome absorption of said at least one group of optical channels by said fiber and said fiber amplifies the signal strength of said at least one group of optical channels when said pump laser injects a sufficient amount of pump power to overcome said absorption.

6. A system as in claim 1 wherein said channel strength monitor directly detects a wavelength and intensity of each group of optical channels using a diffraction grating and a charge coupled device (CCD) detector.

7. A system as in claim 1 wherein said channel strength monitor utilizes a scanning filter to scan said multiple groups of optical channels.

8. A system as in claim 1 further including at least one optical network element, the or each element receiving at least one group of optical channels, the or each element causing a loss in signal strength in said at least one group of optical channels when said at least one group of optical channels passes through the or each elements wherein a compensation module receives said at least one group of optical channels after said at least one group of optical channels passes through the or each elemnt.

9. A programmable optical processor capable of changing a signal strength of an input group of optical signals, and for use with at least one non-gain flattened optical amplifier, said processor comprising:
- a controllable compensation module receiving said input group of optical signals and producing an output group of optical signals;
- a controller controlling said compensation module; and
- a signal strength monitor coupled to said controller and coupled to determine a signal strength of said input group of optical signals and of said output group of optical signals, wherein
- said controller causes said module to attenuate or amplify the signal strength of said input group of optical signals to produce said output group of signals based on an input from said signal strength monitor,
- said signal strength monitor is coupled to an optical switch such that said monitor can be coupled to receive either said input signal or said output signal.

10. A processor as in claim 9, wherein said compensation module comprises:
- a pump laser controlled by said-controller; and
- a predetermined length of Erbium doped fiber receiving said at least one group of optical channels wherein said fiber attenuates the signal strength of said input group of optical signals when said pump laser injects an insufficient amount of pump power to overcome absorption of said at least one group of optical channels by said fiber and said fiber amplifies the signal strength of said at least one group of optical channels when said pump laser injects a sufficient amount of pump power to overcome said absorption.

11. A method of controlling a signal strength of each of multiple groups of optical channels, said method comprising:
- a) determining an input or an output signal strength of each of said multiple groups of optical channels using a signal strength monitor;
- b) determining for each group of optical channels whether said group of channels requires a change in signal strength based on predetermined criteria;
- c) for each group of optical channels, when said group of optical channels requires a change in signal strength, determining an amount of change required in said signal strength, and
  - c1) when said group of optical channels requires an increase in signal strength, amplifying said group of optical channels;
  - c2) when said group of optical channels requires a decrease in signal strength, attenuating said group of optical channels, wherein steps c1) and c2) are accomplished by a single module,
wherein a signal strength monitor is coupled to an optical switch such that said monitor can be coupled to receive either an input or an output signal of each of said multiple groups of signals.

12. A method as in claim 11 wherein at least one of said predetermined criteria is chosen from a group comprising:
- a source of said group of optical channels;
- a destination of said group of optical channels;
- a predetermined minimum signal strength level;
- a predetermined maximum signal strength level.

13. A controllable compensation module for altering a signal strength of at least one input group of optical signals said module comprising:
- amplifying means for amplifying said signal strength of said at least one group of optical signals;
- attenuating means for attenuating said signal strength of said at least one group of optical signals; and
- controlling means for controlling an amount of amplification or attenuation provided by said module, wherein
- said module alters said signal strength based on a command from a controller,
- said controlling means controls said amplifying means and said attenuating means such that said module either amplifies or attenuates said signal strength at any one time,
- said module is used with non gain flattened amplifiers,
- said module monitors said signal strength of said at least one input group of optical signals through a signal strength monitor, said signal strength monitor being coupled to an optical switch to monitor either said at least one input group of optical signals or at least one output group of optical signals.

* * * * *